United States Patent [19]

Deck

[11] 4,166,272

[45] Aug. 28, 1979

[54] PROCESS FOR DATA TRANSFER WITH INCREASED SECURITY AGAINST CONSTRUCTION MEMBER ERROR

[75] Inventor: Werner Deck, Ludwigshafen am Rhine, Fed. Rep. of Germany

[73] Assignee: BBC Brown Boveri & Company Limited, Baden, Switzerland

[21] Appl. No.: 731,350

[22] Filed: Oct. 12, 1976

[51] Int. Cl.$^2$ ........................ G06F 11/00; G08C 25/00

[52] U.S. Cl. ................................................ 340/146.1 C

[58] Field of Search ............... 340/146.1 C, 146.1 BA

[56] References Cited

U.S. PATENT DOCUMENTS

| | | | |
|---|---|---|---|
| 3,344,353 | 9/1967 | Wilcox | 340/146.1 C |
| 3,427,585 | 2/1969 | Milford | 340/146.1 BA |
| 3,737,577 | 6/1973 | Birkin | 340/146.1 BA |
| 3,772,649 | 11/1973 | Haselwood et al. | 340/146.1 BA |
| 3,781,792 | 12/1973 | Birkin | 340/146.1 BA |
| 3,876,980 | 4/1975 | Haemmig et al. | 340/146.1 BA |
| 3,986,167 | 10/1976 | Paul | 340/146.1 BA |

*Primary Examiner*—Charles E. Atkinson
*Attorney, Agent, or Firm*—Frank L. Durr; Orville N. Greene

[57] ABSTRACT

A process for exerting control over a remote facility by transmission of control data protected against error due to component breakdown and/or failure as a result of said process, which comprises; creating a message having a plurality of bits in which the states of at least selected ones of the bits determine the presence (or absence) of a particular command; transmitting the message in serial fashion; inverting the message bits after each message transmission so that the bits of the message are transmitted in true and inverted form in an alternating fashion. The message bits are preferably employed to modulate a carrier. A receiver demodulates the carrier and places the message bits representing a particular command across a transformer input winding. The transformer preferably has a saturable magnetic core having a right-angle hysteresis curve characteristic.

The state of one bit of the message is preferably established by a constant reference source which, however, is also subject to inversion along with all other bits of the message. Additional security coding may be employed to provide increased protection against error.

10 Claims, 1 Drawing Figure

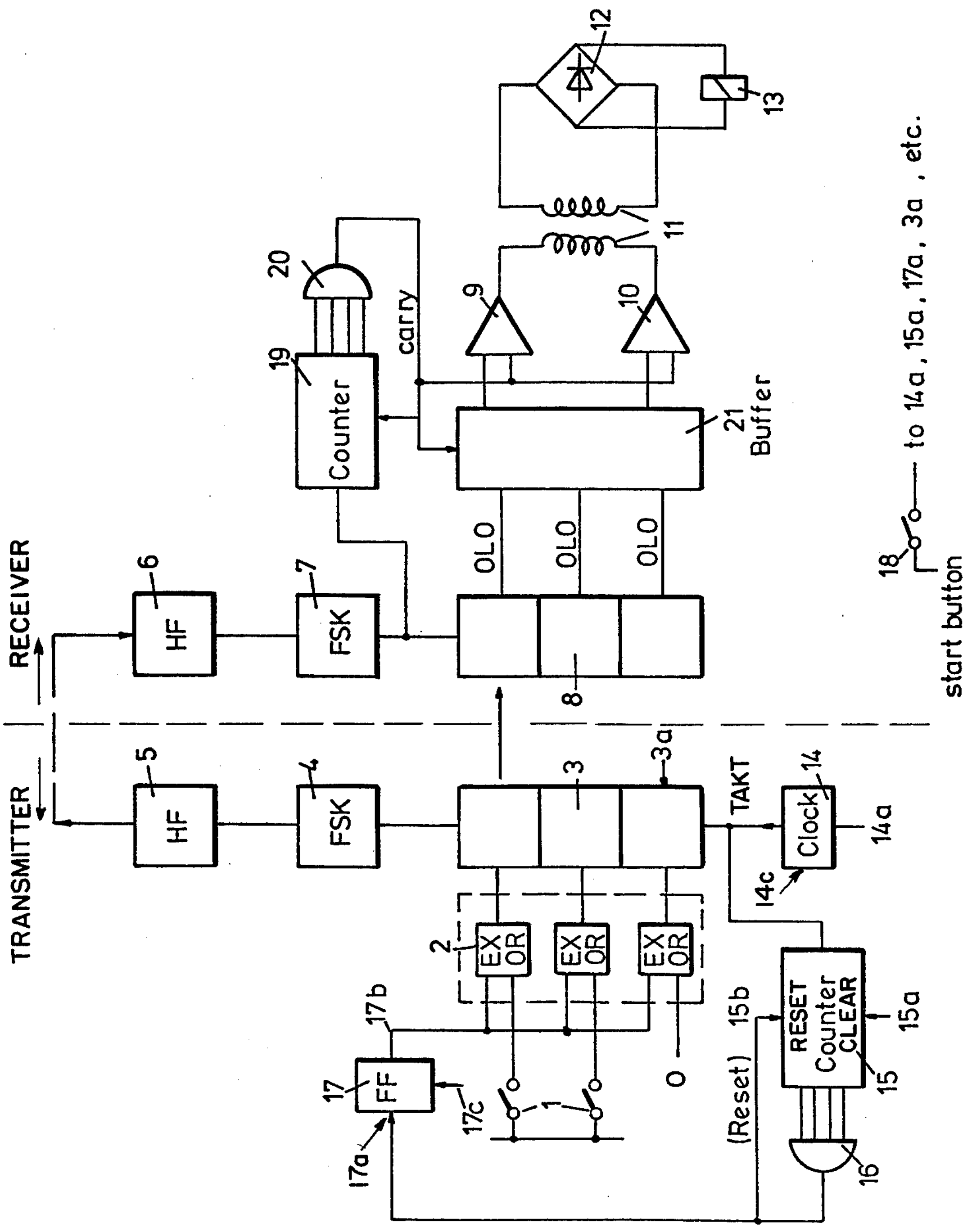
TRANSMITTER
RECEIVER
HF
FSK
EX OR
FF
Clock
TAKT
RESET
Counter
CLEAR
(Reset)
carry
Buffer
OLO
to 14a, 15a, 17a, 3a, etc.
start button
2
3
3a
4
5
6
7
8
9
10
11
12
13
14
14a
14c
15
15a
15b
16
17
17a
17b
17c
18
19
20
21

PROCESS FOR DATA TRANSFER WITH INCREASED SECURITY AGAINST CONSTRUCTION MEMBER ERROR

BACKGROUND OF THE INVENTION

The invention concerns a process for data transfer with increased security against errors due to imperfections or failure of system components and finds application in remote control techniques, for example, radio-telecontrol fo locomotives.

Processes for monitoring defective construction elements are known. For example, in a configuration of a data working element a binary signal is used to modulate an alternating current signal. The binary signal zero means no voltage and the binary signal 1 the existing alternating current. This is only possible by a charge of alternating current amplification. So it is, for example, that the Siemans firm developed URTL, which is so charged as not to allow construction errors to lead to a dangerous working condition. The URTL (Monitorable (=Ueberwachbare)—Resistor—Transistor—Logic) process is one of the available error-secure switching network systems. Error security is attained such that the building unit will be built two-channelled and controlled. Both channels are related to each other by antivalent timing signals, wherein one monitor signal is injected with another key relation. The monitor signal is then evaluated by a monitor amplifier. The process works with a timed direct current impulse. The process has widespread use. For small scale operations, however, the process becomes too costly.

Another known technique employs a monitor switch (see German DT-OS No. 2,459,068) having a magnet circuit with different windings. The equivalence between two windings determines whether the output will develop a signal or not. A supplemental supervisory circuit B2 is in this way foreseen and the defective condition is thereby recognizable. However, the limited input possibility is disadvantageous.

BRIEF DESCRIPTION OF THE DRAWING

A demonstration example according to the invention process will be brought out clearer by the following detailed description and drawing in which there is shown a block diagram of a system embodying the principles of the present invention.

DETAILED DESCRIPTION OF THE INVENTION

With the pilotless operation of locomotives by means of radio-telecontrol the individual operations are observed by the loading and unloading of a required person and the regulated operating sequence engaged. For simplification only the operation of the start of the locomotive by an ON-OFF switch will be shown in the demonstration example. Further necessary commands could be the constant performance of braking, emergency braking, horn blowing, radio transmission, forward coupling, rear coupling, forward movement, backward movement, etc. According to the illustrated example occurring binary connections are described in the drawing near the respective construction element.

On the side of the radio transmitter there is a contact 1 for receiving orders. Particularly for safeguarding data two channels may be employed, if desired.

One of the input leads is guided to a secure reference signal. In the drawing, for example, the ZERO signal is being used. The supplementary input reference signal is an essential ingredient of the process. Without this reference signal a transmission with increased security according to the suggested process is not possible.

All input leads are each led to an "Exclusive-OR" array 2. The second input of the Exclusive-OR circuit will be acted upon with a signal, which changes its condition after every complete exit of the contents of all of the stages of the shift register 3. The shift register 3 converts the parallel data to a serial (binary) sequence. Shifting pulses $T_{akt}$ are generated by a continuous pulse source 14 (which may be a clock source) and are applied to both shift register 3 and a counter 15. Counter 15 is in cremented by one count upon the receipt of each shifting pulse. Selected outputs of the counter 15 are coupled to inputs of binary-decimal decoder 16 which generates a trigger pulse each time the counter reaches a predetermined valve. The trigger pulses generated by decoder 16 are applied to input 17*a* of bistable flip-flop 17. Each time a trigger pulse is applied to input 17*a*, the output level at 17*b* changes state. For example, if it is assumed that shift register 3 has three stages, counter 15 is adapted to count to a binary count of at least 11 (i.e. decimal "3"). Decoder 16 is adapted to develop a trigger pulse only at the binary count 11. This pulse is applied to the input of flip-flop 17 and to the reset input 15*b* of counter 15 to respectively change the binary output level at 17*b* and to reset counter 15 to zero. Thus, each time the contents of all of the stages of register 3 are shifted out, the binary level, applied to all inputs of circuit 2 from 17*b*, is reversed. To assure proper synchronism between and among the circuits, a start button 18 is provided. By depressing (i.e. "closing") the start button a "prime" signal is applied to the clear input 15*a* of counter 15, the clear input 3*a* of register 3, and; to the reset input 17*c* of flip-flop 17. The prime signal is also applied to input 14*c* of pulse generator 14 to temporarily disable the pulse generator until the above mentioned circuits are "primed", thus assuring proper synchronism of the transmitter circuitry.

In an advantageous way, and in accordance with the circuitry described hereinabove, this binary sequence is completed to a total message by a synchronized signal. Between the input 1 and shifting register 3 of the Exclusive-OR circuit 2 there is an inversion of the input signals applied to the shift register 3 after every complete message. With the contact position shown, a 000/111/000 binary sequence will also be generated. A FSK (frequency shift keying) signal modulator 4 is connected to the output stage of the shift register 3. The FSK signal modulator generates an FSK signal in accordance with the digital signal shifted out of shift register 3. A HF modulator 5 modulates and amplifies the signals from modulator 4. The signals are then transmitted to the receiving station.

At the transmitting station for example, between shift register 3 and FSK modulator 4, it may be preferable to utilize a further coding arrangement for increasing the security of the system. Such a coding system is optional and is not shown in the drawing for purposes of simplicity.

On the receiving side (located in the locomotive), the data is demodulated by the HF- receiver sub-assembly 6, is converted by the FSK sub-assembly 7 to the appropriate binary signals and fed serially into the shift register 8.

The shift register 8 has three output terminals. Depending on the signals on the transmitter side, three sets of signals 000/111/000 could be sequentially transcribed on the outputs of the stages of shift register 8. The two outside terminals of the shift register 8 are applied to the amplifiers 9 and 10. The middle terminal of the shift register 8 has been left unconnected as shown in the drawing. Its output signal will, however, be further utilized in the same way as the output signal of the above mentioned outputs of the shifting register 8.

The outputs of both amplifiers 9 and 10 lead to the respective end terminals of the primary side of a transformer 11. The secondary winding of the transformer is coupled to a rectifier bridge 12, whose output is coupled across relay 13. The transformer 11 has a magnetic core having a magnetic property characterized by a right-angle hysteresis curve with high remanence.

When the binary "0" signal is generated by both outputs of the amplifiers 9, 10, and applied to the primary winding of the transformer 11, no current flows; the transformer remains in the remanence and carries over no signal on the secondary side. By known synchronizing techniques the start bit of each complete message (consisting of three binary bits in the present example) may be employed to set a counter 19 to zero. A local pulse generator at the receiver facility then applies pulses to increment counter 19 in synchronism with the transmission rate and hence in synchronism with the pulse generator 14 provided at the transmitter facility. Decimal decoder 20 (similar to decoder 16) provides an enabling signal which resets counter 19 each time a count of three is accumulated. The enabling signal is also applied to amplifiers 9 and 10 together with the outputs of register 8 (either directly or through suitable logic gates), to enable the amplifiers 9 and 10 only when register 8 is loaded with a complete message.

When the inverted signal (inverted by the Exclusive OR circuit 2,) is received at the receiver, a binary 1 signal appears at the outputs of both amplifiers 9 and 10 (creating no voltage drop across the primary winding), and no current can again flow. At the output (secondary) of the transformer no current can flow and the relay remains deenergized.

When switch 1 at the input of the transmitter system is closed it indicates that, an order should be given to the locomotive. The relay 13 at the receiver facility must respond to this signal. On the transmitter side a change of the transmitted binary sequence is caused by the closed switch 1. The altered binary sequence causes a differential potential on the primary side of the transformer 1 specifically a binary "1" appears at one end of the transfer primary and a binary "0" appears at the other end.

The magnetic core is continually magnetized and demagnetized and develops an alternating current on the secondary side of the transformer, which is converted in the rectifier 12 to an energizing voltage for the relay 13.

By the alternating transformation from the true to the inverted messages and separate subsequent treatment, a high security against the failure of a system component in the transmittal distance is achieved.

In the event of a system component failure the magnetic core assumes a polarity only by impulse. It is saturated in a very short time interval and can then no longer emit an output signal of a dangerous working condition.

What is claimed is:

1. A process for transmitting data for remote control purposes and the like in which security against error due to component breakdown and/or failure is provided, comprising the steps of:

(a) creating a message of binary bits;

(b) transmitting the message in serial fashion;

(c) reversing the bits of the message each time a full message transmission is completed so as to alternately transmit the message in true and in inverted form;

(d) transmitting the true and the inverted form a plurality of times;

(e) receiving the transmission of said true and inverted messages;

(f) examining at least two selected bits of each true and inverted message for a binary state creating a control output only when the pair of examined bits alternate state relative to one another due to alternating inversion of the messages;

(g) said step of creating a message further comprises the step of setting the said pair of bits to be examined at the receiving end in the same binary state to represent the absence of a control request and setting a pair of bits at different binary states to represent the presence of a control request.

2. The process of claim 1 further comprising the step of assigning one bit of the message as a reference bit and generating a constant bit level, which however, also has its binary state inverted during transmission of the inverted message form.

3. The process of claim 1 wherein the step of creating the control output further comprises the steps of creating an alternating signal from said pair of bits of different binary states;

converting the alternating signal into a direct current type signal and providing an output component sensitive to said d.c. signal to thereby carry out the desired control function.

4. The process of claim 1 wherein the transmitting step further comprises the steps of transmitting a carrier signal and modulating the carrier signal in accordance with the binary bits of the true and inverted message forms.

5. The process of claim 4 wherein the modulating step comprises the steps of converting the binary bits into a signal of a predetermined frequency and utilizing the frequency signal to modulate the carrier.

6. Apparatus for directing an operation by remote control wherein the system provides security against error due to component breakdown or failure comprising:

means for creating a message of binary bits;

means for transmitting the message in serial fashion;

means for reversing the bits of the message each time a full message transmission is completed so as to alternately transmit the message and inverted form;

means for transmitting the true and inverted form a plurality of times;

means for receiving the transmission of said true and inverted messages;

means for examining at least two selected bits of each true and inverted message for a binary state creating a control output only when the pair of examined bits alternate state relative to one another due to alternating inversion of the messages; and said means for comprising a message of binary bits further comprising means for setting the pair of binary bits to be examined at the receiving end in the same binary state to represent the absence of a control request and for setting the pair of bits at different states to represent the presence of a control request.

7. The apparatus of claim 6 wherein said means for examining at least two selected bits includes means for generating an alternating signal whenever said pair of bits are set at the binary state which represents the presence of a control request;

means for converting said alternating signal into a direct current signal; and means responsive to said direct current signal for carrying out the desired operation called for by the request signal.

8. The apparatus of claim 7 wherein said alternating signal generating means comprises transformer means having an input winding coupled across said selected bit positions.

9. The apparatus of claim 8 wherein said transformer means has a magnetic core member having a right-angle hysteresis characteristic adapted to saturate rapidly.

10. The apparatus of claim 9 wherein said transformer has a second output winding inductively coupled to said primary winding by a suitable magnetic core;

said signal converting means comprising a bridge rectifier coupled across said output winding;

said means for carry out of control operation requested comprising relay means coupled across the output of the bridge rectifier.

* * * * *